(12) United States Patent
Sundararajan et al.

(10) Patent No.: US 9,114,773 B2
(45) Date of Patent: Aug. 25, 2015

(54) THIN PLATE STRUCTURAL SUPPORT FOR A MOTOR VEHICLE ARMREST

(71) Applicant: FORD GLOBAL TECHNOLOGIES, LLC, Dearborn, MI (US)

(72) Inventors: Srinivasan Sundararajan, Ann Arbor, MI (US); Krish E. Aekbote, Farmington Hills, MI (US); Nitesh C. Jadhav, Canton, MI (US); Ken S. Laird, Canton, MI (US); Linh Doan, Belleville, MI (US); Yudong Zhou, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/101,593

(22) Filed: Dec. 10, 2013

(65) Prior Publication Data

US 2015/0158448 A1    Jun. 11, 2015

(51) Int. Cl.
*B60R 21/04* (2006.01)
*B60N 2/26* (2006.01)
*B60N 2/46* (2006.01)

(52) U.S. Cl.
CPC .............. *B60R 21/0428* (2013.01); *B60N 2/46* (2013.01)

(58) Field of Classification Search
CPC .. B60N 2/4235; B60N 2/466; B60N 2/42709; B60N 2/4228; B60N 2/4249; B60N 2/468; B60R 21/0428; B60R 19/00; B60R 2021/0421
USPC .................. 296/153; 244/118.6; 297/188.16, 297/188.19, 232, 411.2, 411.32, 411.36, 297/411.38; 248/311.2
See application file for complete search history.

(56) References Cited

U.S. PATENT DOCUMENTS

| | | | |
|---|---|---|---|
| 3,362,749 A * | 1/1968 | Clement | 297/411.21 |
| 6,142,563 A | 11/2000 | Townsend et al. | |
| 6,893,077 B1 * | 5/2005 | DeJongh | 296/187.05 |
| 7,070,221 B2 * | 7/2006 | Cowelchuk et al. | 296/39.1 |
| 7,775,584 B2 * | 8/2010 | Hughes et al. | 296/187.05 |
| 7,828,388 B2 | 11/2010 | Thomas | |
| 8,029,041 B2 * | 10/2011 | Hall et al. | 296/146.6 |
| 8,123,280 B2 | 2/2012 | Hori et al. | |
| 8,172,311 B2 | 5/2012 | Hughes, Jr. et al. | |
| 2005/0194806 A1 * | 9/2005 | Cowelchuk et al. | 296/1.09 |
| 2009/0146480 A1 * | 6/2009 | Knowlden | 297/411.2 |

FOREIGN PATENT DOCUMENTS

JP    2005289250    10/2005

OTHER PUBLICATIONS

Payne and Patel, Seat Armrests, Occupant Protection & Egress in Rail Systems Project, 2001, p. 5.4.2, Union of European Railway Industries.

* cited by examiner

*Primary Examiner* — Glenn Dayoan
*Assistant Examiner* — Sunsurraye Westbrook
(74) *Attorney, Agent, or Firm* — Frank MacKenzie (57) ABSTRACT

A motor vehicle door and armrest assembly using a thin plate that is vertically strong while laterally collapsible. The plate is comprised of a matrix of intersecting parallel struts forming four sided cells having a first set of opposing acute angles and a second set of opposing obtuse angles. The obtuse angles span a direction normal to the motor vehicle door and allow the plate to more easily limit force transmission from a side impact force. The struts are coupled to a frame, the coupling struts variable in cross sectional area to further determine the lateral stiffness of the plate.

12 Claims, 6 Drawing Sheets

FIG. 14 ated motor vehicle armrest structure.

Motor vehicle armrests support vertical loads. The vertical load may be from a vehicle occupant's arm resting on the armrest. Or, because armrests are commonly mounted to the inside face of motor vehicle doors, the vertical load may be from an individual opening the door and using the armrest to reach the vehicle roof.

The armrests also have lateral strength requirements. If the motor vehicle is involved in a side impact collision, there is the possibility the armrest will strike the vehicle occupant. This may be because the vehicle occupant is thrown against the armrest or because the door bearing the armrest is propelled into the vehicle occupant. If the armrest is too stiff laterally, then the potential for injury due to the armrest striking the vehicle occupant increases.

A typical motor vehicle armrest design uses a top plate and frame for structural support. The top plate and frame are clad with appropriate cushioning and finish coverings. So as to be collapsible in a horizontal direction while still providing vertical support, the top plate commonly employs an open cellular construction. Prior art motor vehicle armrests with hexagonally arranged cell walls have been used for vertically strong yet laterally collapsible armrests. It would be desirable to decrease lateral stiffness even further while still being able to support high vertical loads, to provide increased usability and durability for the vehicle occupant.

SUMMARY OF THE INVENTION

This invention includes a structural assembly to support a vertical load on a motor vehicle armrest while still being laterally collapsible for limiting force transmission from a side impact collision. It employs a generally horizontal plate mounted to the interior face of a motor vehicle door. The plate is overlaid by a cover piece such as cushioning or finish material to form an armrest. It may also be incorporated into an armrest support body including vertical sides and additional attachment points.

The plate comprises a matrix of structural cells having a first set of opposite acute angles and a second set of opposite obtuse angles. The obtuse angles span a direction normal to the interior face of the motor vehicle door and the beams comprising the cells are non-parallel to a direction normal to the interior face of the motor vehicle door. The smaller the acute angles are, the more readily the structural plate will collapse and limit force transmission from a side impact. The structural cells are coupled to a frame around the perimeter of the plate. The couplings can be continuations of the beams, normal to the frame, or aligned independently of the beams forming the matrix.

The lateral stiffness of the structural plate can also be controlled by varying the cross sectional area of the coupling struts. The less the cross sectional area the coupling struts have, the less stiff and more easily collapsible the plate will be in side impacts. The cross sectional area of the coupling struts may be varied along a longitudinal axis from the front to the rear of the motor vehicle.

DETAILED DESCRIPTION OF PREFERRED EMBODIMENTS

Figure 1:
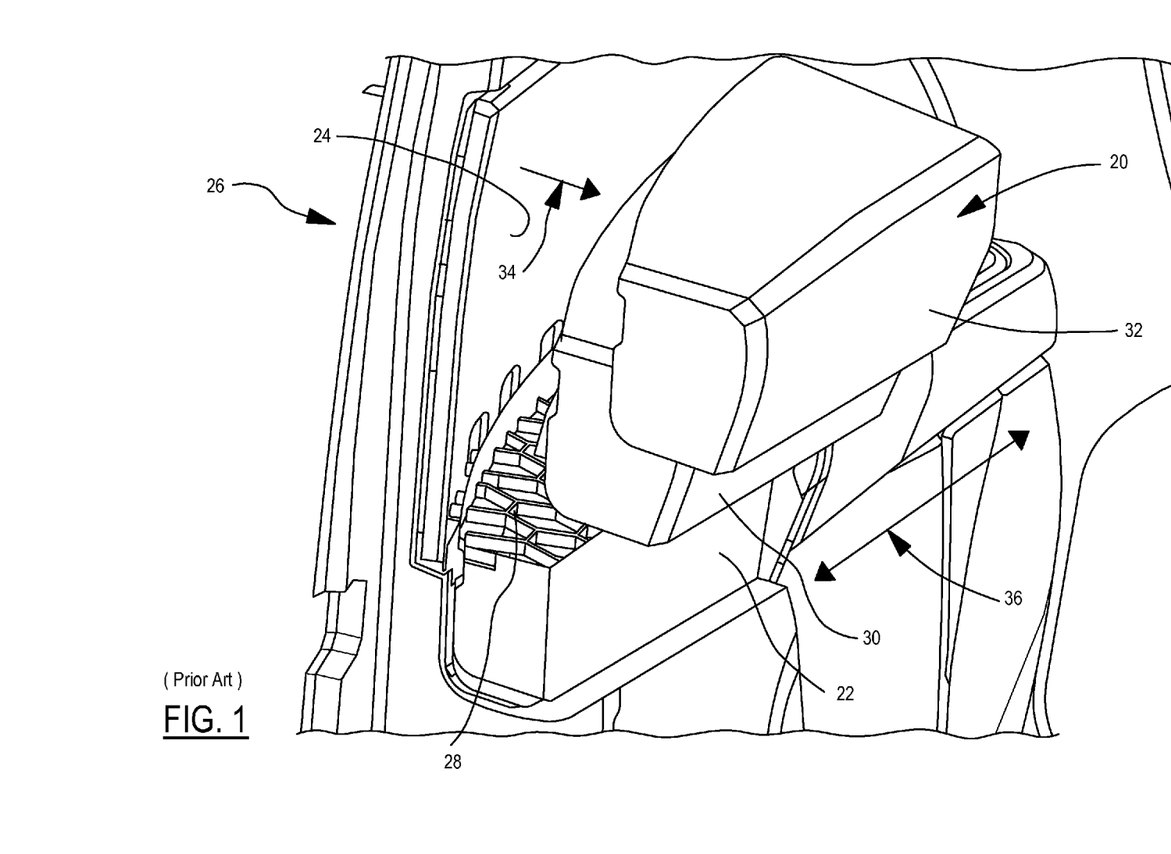
FIG. 1 is an exploded view of a motor vehicle door and armrest assembly according to the prior art.
Figure 2:
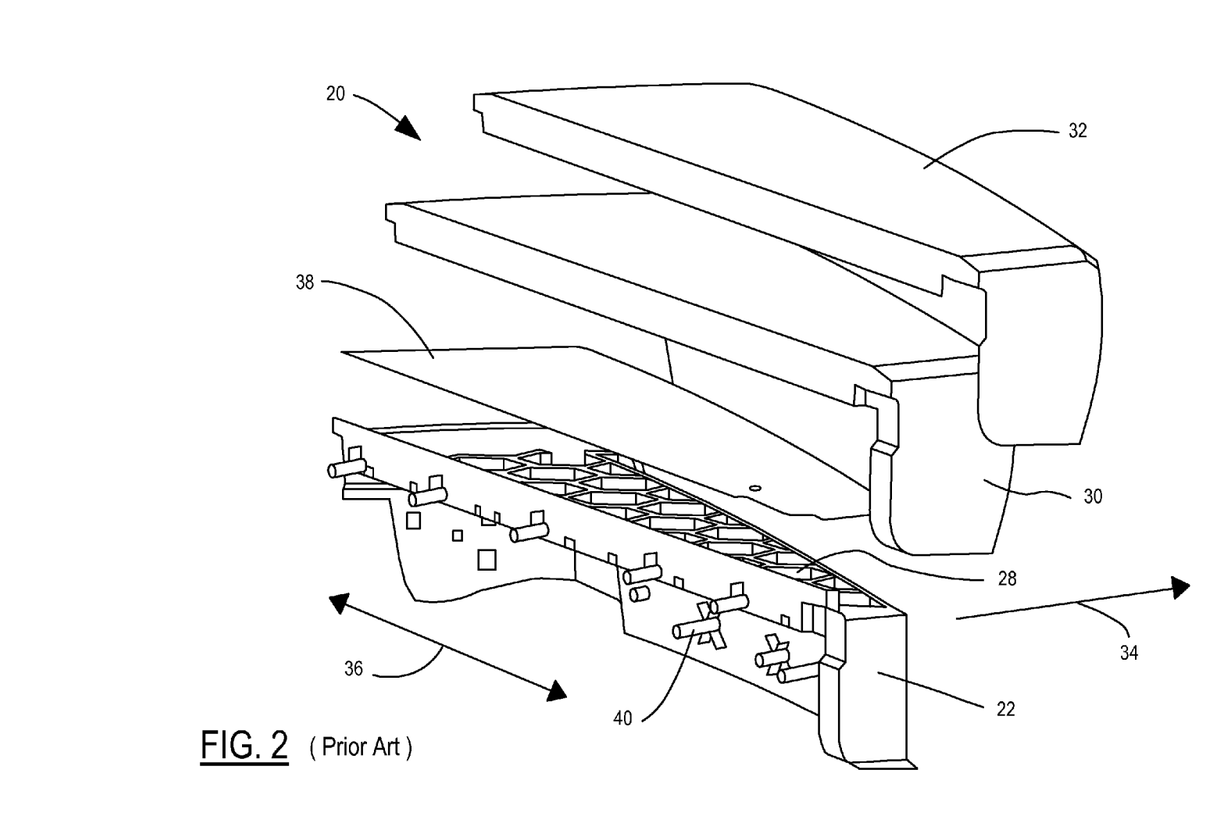
FIG. 2 is an exploded view of a motor vehicle door and armrest assembly according to the prior art.

Referring now to FIGS. 1 and 2, a prior art armrest 20 has an armrest support body 22 attached to an inside face 24 of a motor vehicle door 26. Incorporated into a top surface of the support body 22 is a structural plate 28. The armrest support body 22 can include vertical faces to provide additional structure to the armrest. The armrest support body 22 and the structural plate 28 may be molded plastic or fabricated from metal. The exposed faces of the support body 22 are in turn overlaid by a sheet 38, a cushioning material 30, and a finish material 32. For example, the cushioning material 30 may be polyurethane foam and the finish material 32 may be cloth, leather, or vinyl. The sheet 38 is made of a flexible material having a high tensile strength. For example, the sheet 38 may be mylar. The sheet 38, the cushioning material 30, and the finish material 32 are attached to the support body 22 and the structural plate 28 using methods known to one skilled in the art. For example, the sheet 38, the cushioning material 30, and the finish material 32 may be mechanically fastened, such as by screws or staples, to the support body 22 and the structural plate 28. Alternatively, the sheet 38, the cushioning material 30, and the finish material 32 may be glued to the support body 22 and the structural plate 28. The support body 22 also has a plurality of pegs 40 for attachment of the support body 22 to matching holes on the inside face 24 of the vehicle door 26 (not shown). There is a direction 34 normal to the inside face 24 and a longitudinal direction 36 substantially parallel to the inside face 24.

Figures 3A, 3B:
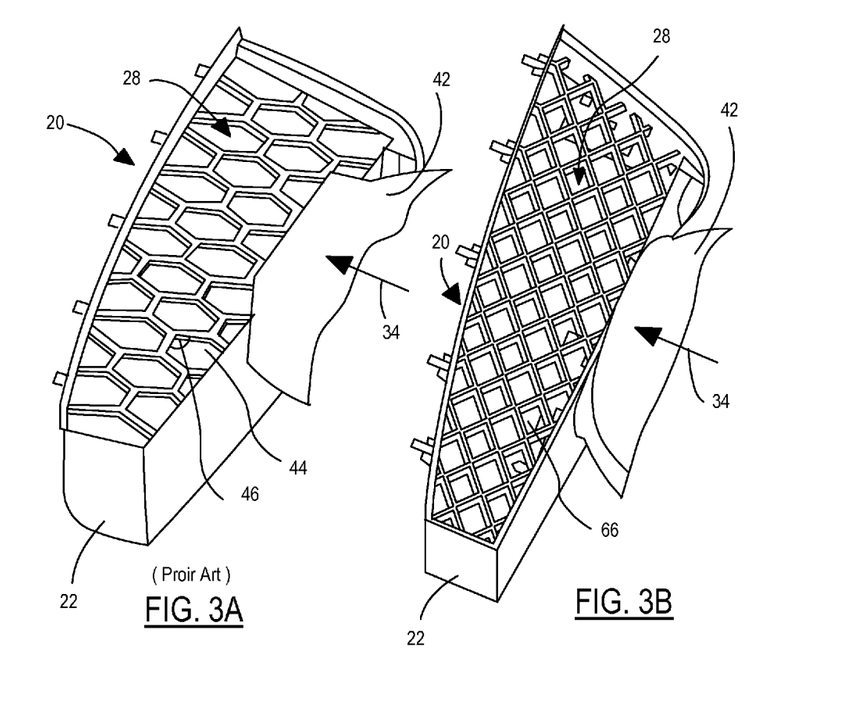
FIG. 3A is a perspective view of a motor vehicle door and armrest assembly according to the prior art.
FIG. 3B is a perspective view of a motor vehicle door and armrest assembly according to the present invention.

A body 42 impacting a prior art armrest 20 is shown in FIG. 3A. For clarity, only the support body 22 and the structural plate 28 of the armrest 20 are shown. The side impact is in the normal direction 34. The structural plate is comprised of a plurality of six walled hexagonal cells 44 forming a matrix. The hexagonal cells 44 have a plurality of obtuse interior angles 46. For example, the obtuse interior angle 46 between two adjoining walls in the hexagonal cells is 120°. As will be discussed below, because of the obtuse angles 46, the force of a side impact in the normal direction 34 does not collapse the matrix of hexagonal cells 44 as readily as the same force would collapse an otherwise similar matrix of cells employing one or more acute angles spanning a direction generally perpendicular to the normal direction 34.

FIG. 3B shows the body 42 impacting an armrest 20 according to the present invention. Because the armrest 20 of this embodiment is an improvement of the embodiment shown by FIG. 3A, like reference numerals designate corresponding parts in the drawings and detailed description thereof will be omitted. The structural plate 28 has a plurality of diamond shaped structural cells 66 with two acute angles spanning a direction generally perpendicular to the normal direction 34. As will be discussed below, the diamond shaped structural cells 66 have reduced lateral stiffness compared to the hexagonal cells 44.

Figure 4:
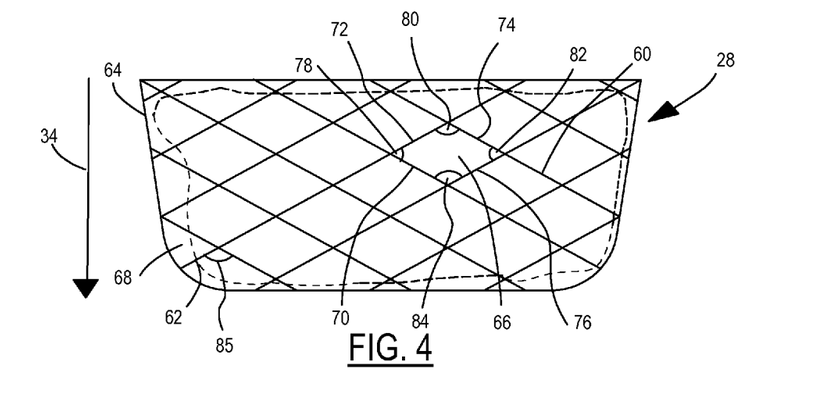
FIG. 4 is a schematic view of an armrest support plate according to an embodiment of the present invention.

FIG. 4 shows a structural plate 28 having a plurality of interior structural struts 60 (illustrated within the dashed line) and a plurality of perimeter structural struts 62 (illustrated outside the dashed line). The interior struts 60 and the perimeter struts 62 are enclosed by a frame 64. The perimeter struts 62 couple the interior struts 60 to the frame 64. The interior struts 60 are arranged in a matrix of a first set of parallel struts intersecting a second set of parallel interior struts to form the plurality of structural cells 66. The spacing shown between the parallel interior struts 60 in the first and second sets is substantially equal. Alternatively, the interior struts 60 may be neither parallel nor equally spaced. The interior struts 60 are not parallel to the normal direction 34. The structural cells 66 formed by the interior struts 60 are four sided and substantially similar in size with parallel opposing sides. The vertical strength of the thin structural plate 28 can be increased by increasing the density of the structural cells 66 in the structural plate 28 or by increasing the cross sectional area of the interior struts 60 and perimeter struts 62. Density of the structural cells 66 can be increased by reducing the spacing between the interior struts 60 to reduce the size of the structural cells 66.

The perimeter struts 62 are linear extensions of the interior struts 60 whereby an angle between the perimeter strut 62 and the interior struts 60 corresponds to an angle between intersecting interior struts 62. For example, a perimeter strut angle 85 corresponds to a second angle 80. The perimeter struts 62 may have the same or different cross sectional shape and area as the interior struts 60.

The perimeter struts 62 form irregularly sized perimeter cells 68 wherein at least one of the sides of the perimeter cells 68 is the frame 64. The perimeter cells 68 vary in their number of sides and geometry. For example, a perimeter cell may have three, four, or five sides.

The structural cell 66 has a first beam 70, a second beam 72, a third beam 74, and a fourth beam 76. The first beam 70 is opposite and substantially parallel to the third beam 74 and the second beam 72 is opposite and substantially parallel to the fourth beam 76. The structural cell 66 also has a first angle 78 between the first beam 70 and the second beam 72, the second angle 80 between the second beam 72 and the third beam 74, a third angle 82 between the third beam 74 and the fourth beam 76, and a fourth angle 84 between the fourth beam 76 and the first beam 70. The first angle 78 and the third angle 82 are acute and the second angle 80 and the fourth angle 84 are obtuse. For example, the first angle 78 and the third angle 82 can each be 30°. The second angle 80 and the fourth angle 84 span the normal direction 34 from the inside face of the motor vehicle door.

A strut perpendicular to a force provides the least resistance to the force. The same strut placed parallel to the force provides the greatest resistance to the force. As the strut is placed in a matrix at an angle between perpendicular and parallel to the force, the resistance of the strut to the force decreases as the angle to the force increases from parallel to perpendicular. As the capacity of the strut to resist force decreases, the ability of the matrix to collapse and limit force transmission increases.

Having the obtuse second angle 80 and fourth angle 84 span the normal direction 34 from the inside face of the motor vehicle door forms a matrix of structural cells 66 with a higher capacity to collapse from a side impact. This orientation of the structural cells 66 places the acute first angle 78 and third angle 82 out of line with the path of the side impact force in the normal direction 34. A structural cell 66 with obtuse angles spanning, and acute angles out of line with, an applied force will much more readily collapse and limit transmission of side impact forces than an otherwise equivalent cell with acute angles spanning the applied force. The more acute the first angle 78 and the third angle 82 are then the more capacity the matrix of structural cells 66 has to limit transmission of forces from a side impact.

Figure 5:
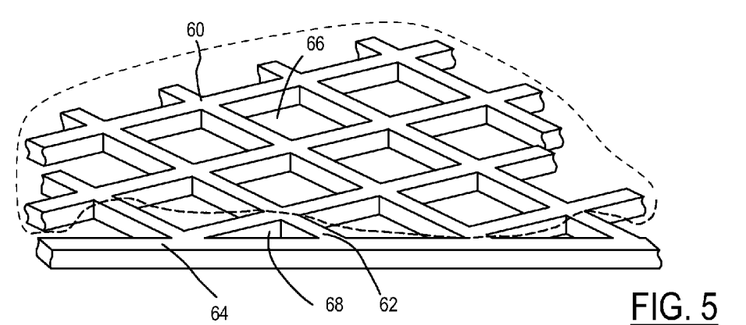
FIG. 5 is a perspective view of a detail portion of the armrest support plate of FIG. 5.

FIG. 5 shows a portion of the structural plate 28 of FIG. 4. Because the structural plate 28 of this figure is a detail view of FIG. 4, like reference numerals designate corresponding parts in the drawings and detailed description thereof will be omitted. The perimeter structural struts 62 are linear continuations of the interior structural struts 60. The perimeter struts 62 have the same cross sectional area as the interior struts 60. One skilled in the art will recognize that the perimeter struts 62 can have other alignments or cross sectional areas than the interior struts 60.

Figure 6:
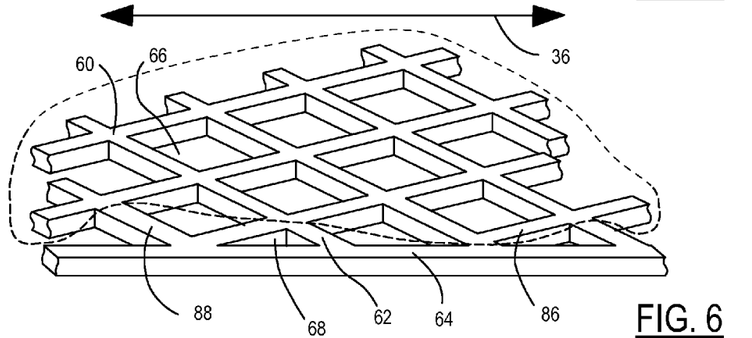
FIG. 6 is a perspective view of a detail portion of an armrest support plate according to another embodiment of the present invention.

FIG. 6 shows a portion of the structural plate 28. Because the structural plate 28 of this embodiment is a modification of the embodiment shown by FIG. 4, like reference numerals designate corresponding parts in the drawings and detailed description thereof will be omitted. The cross sectional areas of perimeter struts 62 vary with respect to a constant cross sectional area of the interior struts 60. The lateral stiffness of the structural plate 28 may be changed by varying the cross sectional area of the perimeter struts 62. The lateral stiffness of the plate is reduced as the cross sectional area of the perimeter struts 62 is decreased.

The cross sectional area of the perimeter struts 62, and in turn the lateral stiffness of the structural plate 28, may progressively vary along the longitudinal direction 36 from the front to the rear of the vehicle. For example, it is generally understood in the art that vehicle occupants with smaller body sizes, sitting in adjustable seats, will sit closer to the front of the vehicle than vehicle occupants with larger body sizes. A vehicle occupant with a smaller body size can also be expected to interact differently with the armrest. Therefore, the perimeter strut 62 cross sectional area may decrease along the longitudinal direction 36 from the rear to the front of the vehicle, thereby making the structural plate 28 less stiff laterally and more force transmission limiting at the front than at the rear of the vehicle. As illustrated, a first perimeter strut 86 has a smaller cross sectional area than a second perimeter strut 88. Additionally, by including some struts with a greater cross sectional area, the vertical load capacity can be increased.

Figure 7:
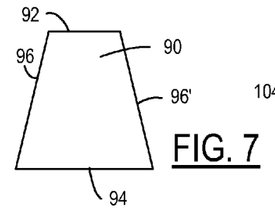
FIG. 7 is a cross section of an armrest support plate strut according to the present invention.
Figure 8:
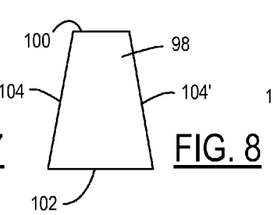
FIG. 8 is a cross section of an armrest support plate strut according to the present invention.
Figure 9:
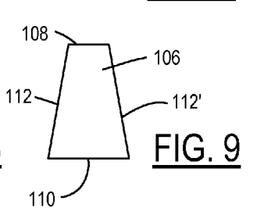
FIG. 9 is a cross section of an armrest support plate strut according to the present invention.

Referring now to FIGS. 7 through 9, FIG. 7 shows a first trapezoidal shape with a first cross sectional area 90. The first cross sectional area 90 has a first top surface 92, a first bottom surface 94, and first side surfaces 96 and 96'. For example, the top surface 92 may be 2.5 mm, the bottom surface 94 may be 3.2 mm, and the vertical height of the cross section between the top surface 92 and the bottom surface 94 may be 4.0 mm. FIG. 8 shows a second trapezoidal shape with a second cross sectional area 98. The second cross sectional area 98 has a second top surface 100, a second bottom surface 102, and second side surfaces 104 and 104'. FIG. 9 shows a third trapezoidal shape with a third cross sectional area 106. The third cross sectional area 106 has a third top surface 108, a third bottom surface 110, and third side surfaces 112 and 112'. The second cross sectional area 98 is less than the first cross sectional area 90. The second top surface 100 is less than the first top surface 92 and the second bottom surface 102 is less than the first bottom surface 94. The third cross sectional area 106 is less than the second cross sectional area 98. The third top surface 108 is less than the second top surface 100, the third bottom surface 110 is less than the second bottom surface 102, and the third side surfaces 112 and 112' and less than the second side surfaces 104 and 104'.

The first cross sectional area 90 can be used for the interior struts 60 while the cross sectional area of the perimeter struts 62 are reduced by using the second cross sectional area 98 or the third cross sectional area 106. Alternatively, the first cross sectional area 90 can be used for the interior struts 60 while the second cross sectional area 98 and the third cross sectional area 106 are used for the perimeter struts 62, the perimeter struts 62 using the third cross sectional area 106 being less stiff and more force transmission limiting than the perimeter struts 62 using the second cross sectional area 98.

Figure 10:
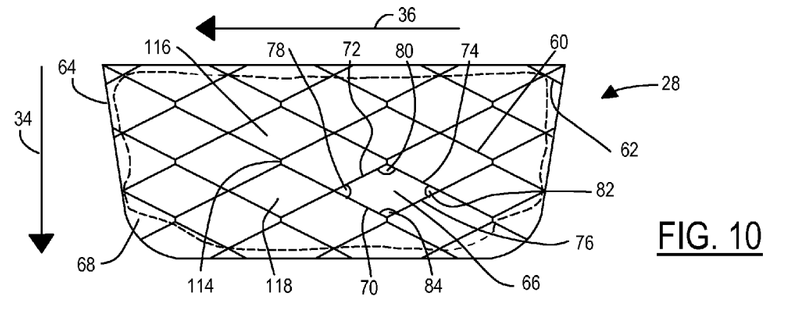
FIG. 10 is a schematic view of an armrest support plate according to another embodiment of the present invention.

FIG. 10 shows another embodiment of the structural plate 28. Because the structural plate 28 of this embodiment is a modification of the embodiment shown by FIG. 4, like reference numerals designate corresponding parts in the drawings and detailed description thereof will be omitted. The structural plate 28 has a bridge beam 114 separating the fourth angle 84 of a first cell 116 from the second angle 80 of a second cell 118. The fourth angle 84 and second angle 80 at the bridge beam 114 are formed without the first beam 70, the second beam 72, the third beam 74, and the fourth beam 76 intersecting. The bridge beam 114 is parallel to the side impact force in the normal direction 34. As previously described, a strut in the parallel direction to a force increases the lateral stiffness of a matrix of structural cells 66 formed with such a strut. Therefore, the bridge beam 114 increases the lateral stiffness and reduces the force transmission limiting capacity of structural plate 28. The bridge beam 114 may be used to tune the lateral and vertical stiffness of the structural plate 28. Increased lateral stiffness of the structural plate 28 is proportional to the number of bridge beams 114 included in the matrix of structural cells 66. The bridge beam 114 may be included uniformly across the structural plate 28 to increase lateral stiffness. For example, as shown in FIG. 10, the bridge beam 114 is included in alternating structural cells 66. Alternatively, the inclusion of the bridge beam 114 can vary along the longitudinal direction 36 to result in varied lateral stiffness.

Figure 11:
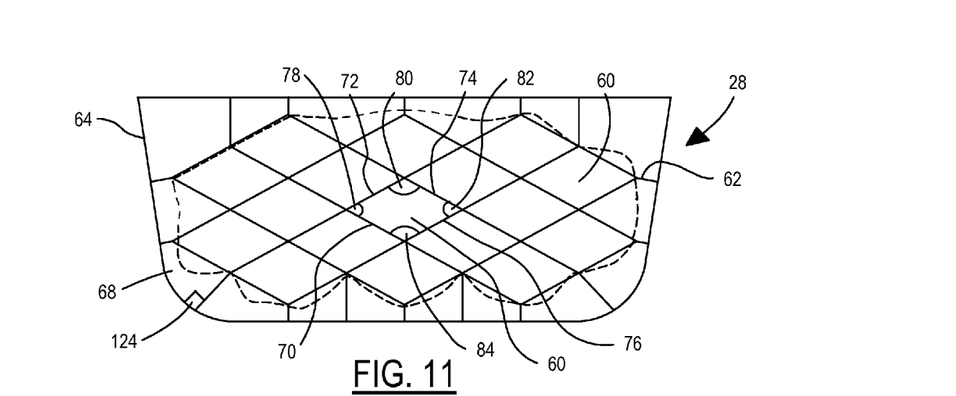
FIG. 11 is a schematic view of an armrest support plate according to another embodiment of the present invention.

FIG. 11 shows another embodiment of the structural plate 28. Because the structural plate 28 of this embodiment is a modification of the embodiment shown by FIG. 4, like reference numerals designate corresponding parts in the drawings and detailed description thereof will be omitted. The perimeter struts 62 are coupled to the frame 64 with a frame connection 124 oriented in the normal direction. The frame connection 124 has the perimeter strut 62 normal to the frame 64. The frame connection 124 increases the lateral stiffness of the structural plate 28 over a comparable structural plate where the perimeter struts 62 are linear continuations of the interior structural struts 60.

Figure 12:
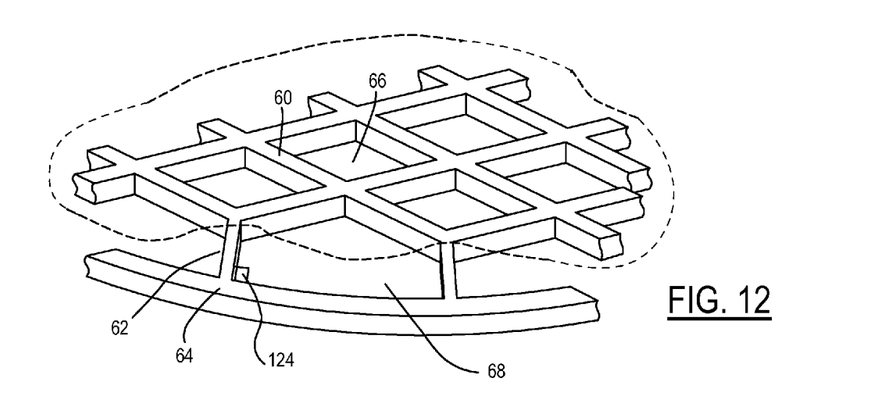
FIG. 12 is a perspective view of a detail portion of the armrest support plate of FIG. 11.

FIG. 12 shows a portion of the structural plate 28 of FIG. 11. Because the structural plate 28 of this embodiment is a modification of the embodiment shown by FIG. 5 and FIG. 11, like reference numerals designate corresponding parts in the drawings and detailed description thereof will be omitted. The perimeter struts 62 are coupled to the frame 64 at the frame connections 124.

Figure 13:
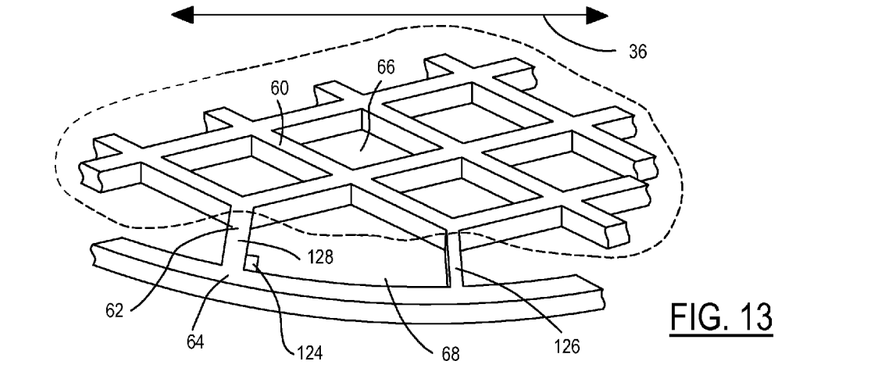
FIG. 13 is a perspective view of a portion of an armrest support plate according to another embodiment of the present invention.

FIG. 13 shows another embodiment of the structural plate 28 of FIG. 11. Because the structural plate 28 of this embodiment is a modification of the embodiment shown by FIG. 6 and FIG. 11, like reference numerals designate corresponding parts in the drawings and detailed description thereof will be omitted. The cross sectional area of the perimeter struts 62 varies with position along the longitudinal direction 36. The third perimeter strut 126 has a smaller cross sectional area than the fourth perimeter strut 128. As a result of its greater cross sectional area, the fourth perimeter strut 128 is laterally stiffer than the third perimeter strut 126, thereby tailoring the lateral stiffness to reduce lateral loads for smaller occupants.

Figure 14:
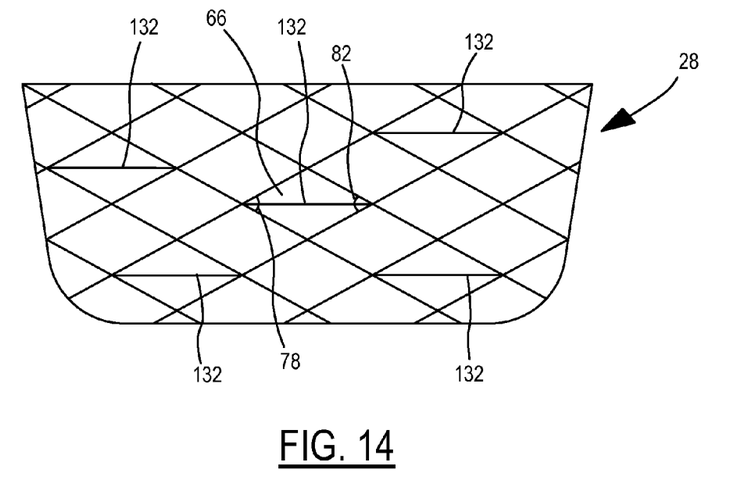
FIG. 14 is a schematic view of an armrest support plate according to another embodiment of the present invention.

FIG. 14 shows another embodiment of the structural plate 28. Because the structural plate 28 of this embodiment is a modification of the embodiment shown by FIG. 4, like reference numerals designate corresponding parts in the drawings and detailed description thereof will be omitted. The structural plate 28 has a plurality of brace beams 132. The brace beams 132 subdivide at least one of the structural cells 66 by spanning between the first angle 78 and the third angle 82 of a structural cell 66. The brace beams 132 increase the vertical stiffness of the structural plate 28 while not significantly altering the lateral stiffness of the structural plate 28 because the brace beams 132 are perpendicular to the lateral side impact force. The brace beams 132 may be placed within strategically located cells in order to tune the vertical stiffness of the structural plate 28.

In accordance with the foregoing, a motor vehicle door and armrest assembly has been described having significant advantages over the prior art. A vertically strong while laterally collapsible thin plate is achieved for an armrest support component.

What is claimed is:

1. A motor vehicle door and armrest assembly, comprising:
   a vehicle door having an interior vertical face;
   a plate, configured to be generally horizontally mounted to the interior vertical face for bearing a vertical armrest load, comprising
      a matrix of interior structural struts forming a plurality of repeating structural cells having first, second, third, and fourth interior structural beams defining acute first angles between the first and second interior structural beams, obtuse second angles between the second and third interior structural beams, acute third angles between the third and fourth interior structural beams, obtuse fourth angles between the fourth and first interior structural beams, a cavity between the first, second, third, and fourth interior structural beams, each interior structural beam being non-parallel to a line extending normal from the interior vertical face, and each obtuse second and fourth angle spanning a respective normal from the interior vertical face, a frame around a perimeter of the plate, and a plurality of perimeter structural struts coupled between the interior structural struts and the frame; and a cover piece overlying the plate.

2. The assembly of claim 1 wherein the first interior structural beams are opposite the third interior structural beams and the second interior structural beams are opposite the fourth interior structural beams.

3. The assembly of claim 1 wherein a first angle of intersection between a first and a second perimeter structural strut corresponds with a second angle of intersection between a first and a second interior structural strut.

4. The assembly of claim 1 wherein the perimeter structural struts are continuations of the interior structural struts.

5. The assembly of claim 1 wherein the perimeter structural struts are in a direction substantially normal to the frame.

6. The assembly of claim 1 wherein the plate is integrated with an armrest support body connected to the door.

7. A motor vehicle door and armrest assembly, comprising:

a vehicle door having an interior vertical face;

a plate configured to be generally horizontally mounted to the interior vertical face for bearing a vertical armrest load, the plate comprising a matrix of interior structural struts forming a plurality of repeating structural cells, a frame around a perimeter of the plate and coupled to the matrix, and a plurality of perimeter structural struts spanning between the interior structural struts and the frame, wherein the perimeter structural struts have a cross sectional area that varies with respect to position along a longitudinal axis from the front of the vehicle door to the rear of the vehicle door; and a cover piece fastened to the plate.

8. The assembly of claim 7 wherein the respective cross sectional area of perimeter struts are generally increasing along the longitudinal axis moving from the front to the rear.

9. The assembly of claim 7 wherein the perimeter structural struts are linear continuations of the interior structural struts.

10. The assembly of claim 7 wherein the perimeter structural struts are in a direction substantially normal to the frame.

11. The assembly of claim 7 wherein the plate is integrated with an armrest support body connected to the door.

12. A motor vehicle door assembly, comprising:

a vehicle door having an interior face;

a plate, configured to be mounted to the interior face, comprising a matrix of four-walled structural cells, each structural cell having opposite obtuse angles oriented laterally to an exterior face; and a trim piece overlying the plate.

\* \* \* \* \*